United States Patent
Uchiyama et al.

(10) Patent No.: US 6,834,250 B2
(45) Date of Patent: Dec. 21, 2004

(54) POSITION AND ORIENTATION DETERMINING METHOD AND APPARATUS AND STORAGE MEDIUM

(75) Inventors: Shinji Uchiyama, Kanagawa (JP); Kiyohide Satoh, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 57 days.

(21) Appl. No.: 09/818,602

(22) Filed: Mar. 28, 2001

(65) Prior Publication Data

US 2002/0103617 A1 Aug. 1, 2002

(30) Foreign Application Priority Data

Nov. 30, 2000 (JP) ........................................ 2000/364230
Feb. 21, 2001 (JP) ........................................ 2001/045536

(51) Int. Cl.$^7$ ................................................ G01C 9/00
(52) U.S. Cl. ..................................................... 702/150
(58) Field of Search ........................ 702/150; 382/107, 382/103, 184; 375/240; 463/1; 345/420, 157

(56) References Cited

U.S. PATENT DOCUMENTS 5,764,786 A * 6/1998 Kuwashima et al. ........ 382/107
5,878,151 A * 3/1999 Tang et al. .................. 382/103
6,445,814 B2 * 9/2002 Iijima et al. ................ 382/154
6,658,282 B1 * 12/2003 Eagan et al. ................ 600/476

OTHER PUBLICATIONS

Andrei State, Superior augmented reality tracking Jul. 1996, pp. 429–438.*
"Superior Augmented Reality Registration by Integrating Landmark Tracking and Magnetic Tracking", State, et al., Proc. SIGGRAPH '96, Jul. 1996, pp. 429–438.

* cited by examiner

Primary Examiner—John Barlow
Assistant Examiner—Tung S Lau
(74) Attorney, Agent, or Firm—Fitzpatrick, Cella, Harper & Scinto (57) ABSTRACT

A viewing transform matrix indicating a position and a orientation of an HMD is generated according to a signal indicating the position and the orientation of the HMD. On the other hand, a landmark and its position are detected based on a captured picture, and a correction matrix ΔMc is generated based on the detected position of the landmark. The position and orientation of the HMD is corrected by using a viewing transform matrix and a correction matrix ΔMc generated in the above mentioned processes, a picture of a virtual object is generated according to an external parameter indicating the corrected position and the orientation of the HMD, and a picture of augmented reality is generated. The generated picture of the augmented reality is displayed on a display unit.

16 Claims, 11 Drawing Sheets

FIG. 11

POSITION AND ORIENTATION DETERMINING METHOD AND APPARATUS AND STORAGE MEDIUM

FIELD OF THE INVENTION

The present invention relates to a position and orientation determination apparatus, method, and a storage medium therefor for determining the position and orientation of a capture means before performing an image process to generate an augmented picture using an image in an unreal space such as computer graphics incorporated into the real space by measuring a parameter indicating the position and orientation of capture means (image pickup means) for capturing the real space with a method other than using a captured picture, and identifying information about a picture whose parameter has been captured. The present invention can also be applied to any means and method for determining the position and orientation of a capture device used for any purpose other than augmenteding the real space and another space image.

BACKGROUND OF THE INVENTION

In an AR (augmented reality) system for augmenting the real space by virtual space such as computer graphics, etc., the position and orientation of a camera cannot be precisely measured in a method, for example, using a position and orientation sensor such as a magnetic sensor, etc., other than using a captured picture, when the real space is captured by the camera. Therefore, when a virtual object is superimposed on the real space based on the position and orientation of the camera measured by the sensor, a displayed image is often shifted from a desired position.

Therefore, in the conventional technology, some methods have been suggested to improve the precision of an external parameter (position and orientation of a camera) for capturing the real space. In one of the methods, a plurality of feature points (landmarks) whose positions are known in a three-dimensional array are arranged in the real space. Then, the external parameter of the camera is corrected using an error between the actual position of a target landmark, included in some landmarks captured by the camera and displayed on the display screen of the camera, and the position of the target landmark predicted based on the position and orientation of the camera at the time, acquired by a position and orientation sensor.

That is, a target landmark can be a marker such as a seal having the information of specific color or form attached to an object in the real space, or a feature point in a natural scene.

In another method, when there are a plurality of landmarks in the real space, using three (or one or two) landmarks in the image captured by a camera, and a measurement value measured by a position and orientation sensor, a projective matrix from the real space (three-dimensional space) to the display screen (two-dimensional plane) of the camera is calculated by a matrix operation, and an external parameter of the camera is corrected using the obtained matrix.

However, in the former method of the above mentioned conventional methods, the external parameter of the camera is corrected based on the target landmark. Therefore, for example, when a virtual object is superimposed on the position at a distance from a target landmark, the object can be shifted from a desired position when it is displayed. Furthermore, since a target landmark is switched and changed when the view of the camera is changed, a correction value can be largely changed when it is switched.

On the other hand, in the latter method of the above mentioned conventional methods, an obtained projective matrix can cause an image to be mapped with incorrect orthogonality of the coordinate axis of the original coordinate system. For example, space distortion can occur depending on the detection precision of a landmark.

The present invention has been developed to solve the above mentioned problem, and aims at correcting the parameter indicating the position and orientation of a camera by reflecting a captured landmark.

SUMMARY OF THE INVENTION

To attain the purpose of the present invention, for example, a position and orientation determination apparatus according to the present invention has the following configuration.

That is, the position and orientation determination apparatus which identifies a parameter indicating the position and orientation of capture means for capturing a picture in a real space containing a plurality of feature points whose positions are known in a three-dimensional array comprising: position and orientation measurement means for measuring the position and orientation of the capture means in a method other than using a captured picture; detection means for detecting the plurality of feature points and their positions in the two-dimensional array on the image pickup screen using the picture in the real space captured by the capture means; prediction means for predicting the positions of the feature points in the two-dimensional array on the image pickup screen based on the position and orientation of the capture means measured by the position and orientation measurement means; and correction means for correcting the parameter indicating the position and orientation of the capture means based on the positions of the feature points on the image pickup screen of the capture means obtained by the prediction means, and based on the position of the feature points obtained by the detection means. With the configuration, the parameter indicating the position and orientation of the capture means for capturing the real space is identified by the correction means correcting the parameter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitutes a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Described first is the conventional method. That is, when there are a plurality of landmarks in the real space, the method of correcting an external parameter of a camera is corrected, using an error between the actual position of a target landmark in some landmarks captured by the camera and displayed on the display screen, and the position of the target landmark predicted based on the position and orientation of the camera obtained by a position and orientation sensor. Described below is the method of using the above mentioned method for a plurality of landmarks according to an embodiment of the present invention.

<Conventional Method>

Figure 1:
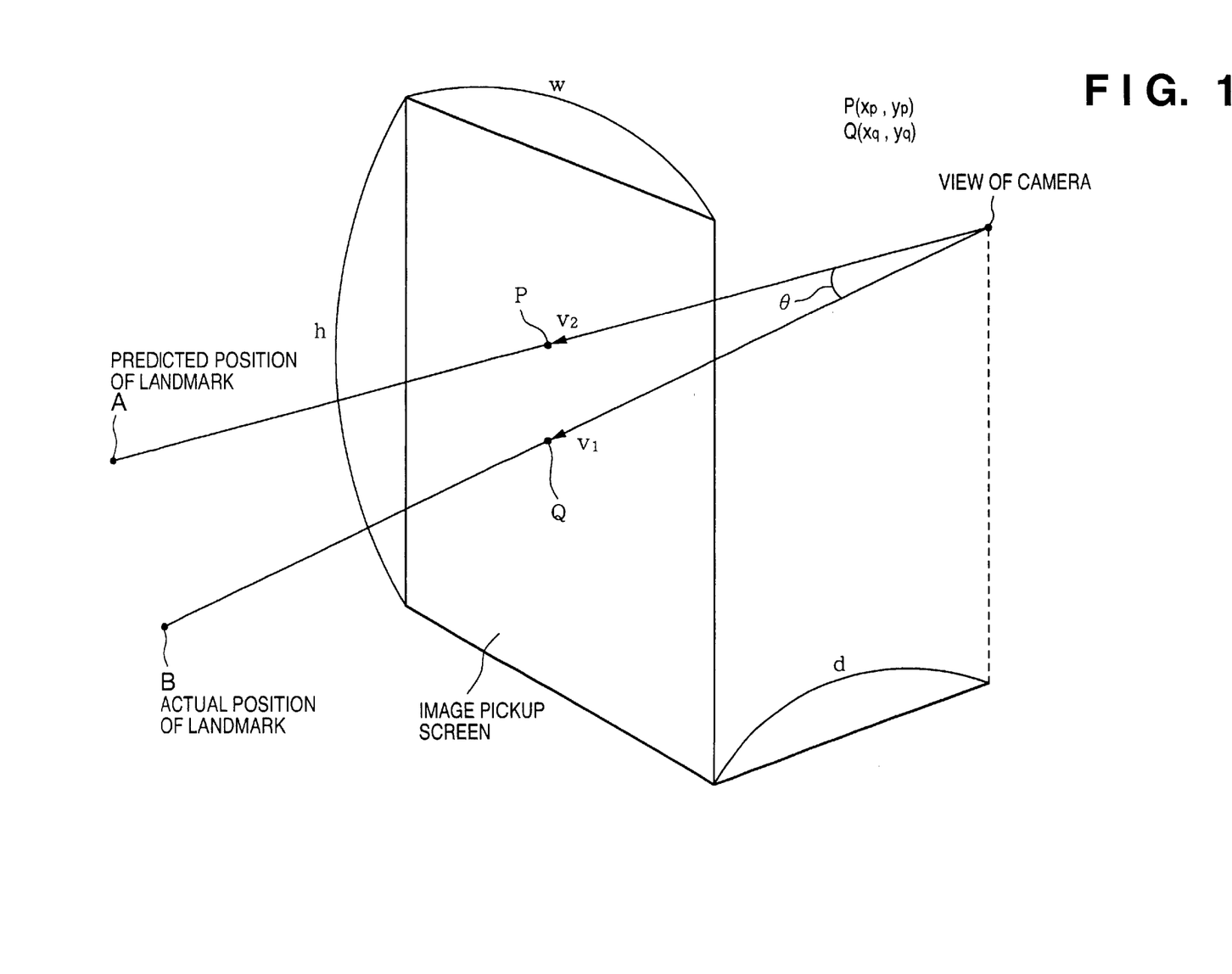
FIG. 1 shows a type of a conventional correcting method.

FIG. 1 shows a type of the above mentioned conventional method. A point A indicates the position of a landmark predicted based on the position and orientation of a camera acquired by a position and orientation sensor. A point B indicates the actual position of the landmark. A point C indicates the position of the view of the camera. The positions indicated by the points A and B are the positions in the camera coordinate system, and the point C is the origin of the camera coordinate system. A point P indicates the position of the point A on the image pickup screen, and a point Q indicates the position of the point B on the image pickup screen. As shown in FIG. 1, the coordinates of the points P and Q are (Xp, Yp) and (Xq, Yq) respectively, the width and the height of the image pickup screen are w and h respectively, the focal distance (distance between the point C and the image pickup screen) of the camera is d, v1 indicates the vector from the point C to the point Q, v2 indicates the vector from the point C to the point P, and θ indicates the angle made by the vectors v1 and v2.

At this time, on the image pickup screen, there can be a shift (error) between the position of the landmark predicted by the position and orientation of the camera and the actual position and orientation. Two methods are suggested to correct the shift. They are: a method of changing the orientation of the camera by θ in the direction from the point B to the point A with the position of the camera fixed (a correcting method by rotating the camera); and a method of moving the camera in parallel by the distance between the points A and B in the direction from the point B to the point A (a correcting method by translating a camera). The two methods are described below by referring to the respective flowcharts shown in FIGS. 7 and 8.

<1. Correcting method by rotating a camera>

Figure 7:
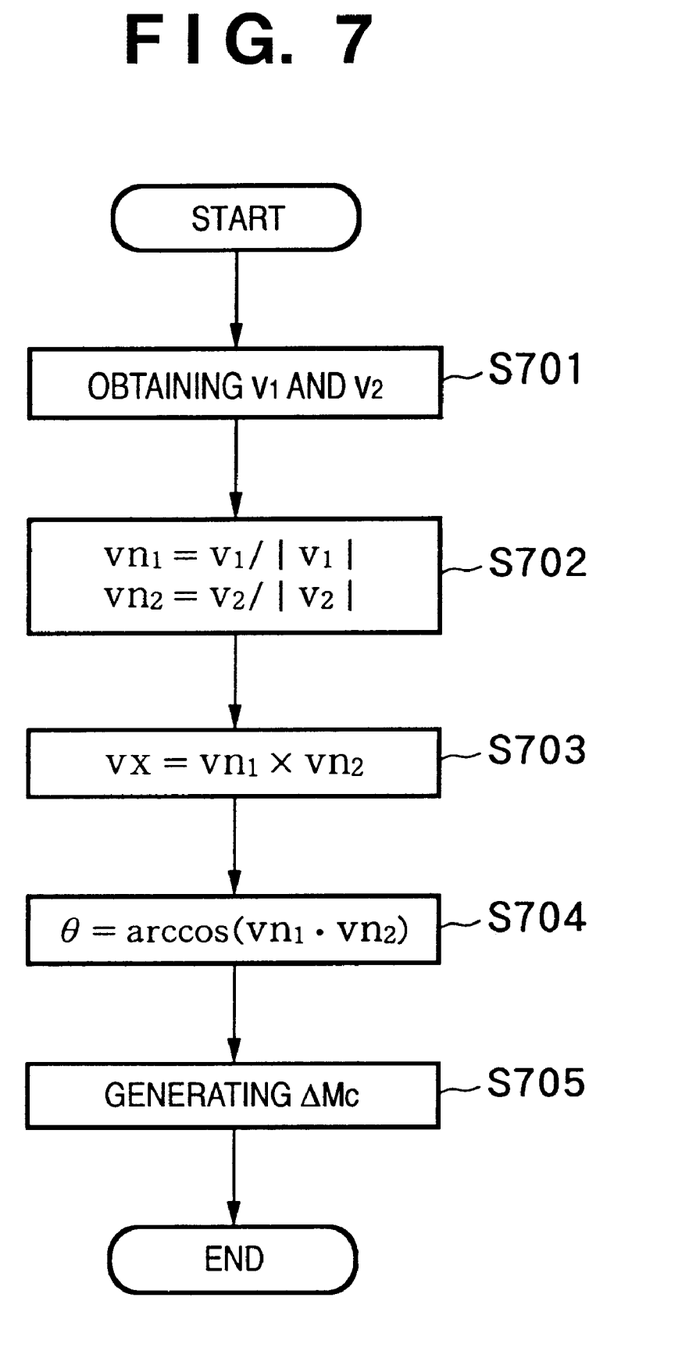
FIG. 7 is a flowchart of the correcting method by a rotation of a camera in the conventional correcting method.

With the above mentioned settings, the elements of the vectors v1 and v2 are expressed as follows (step S701).

$$v1=(Xq-w/2, Yq-h/2, -d)$$

$$v2=(Xp-w/2, Yp-h/2, -d)$$

the respective vectors are normalized into the vector of a size of 1 (step S702). In this expression, |v| indicates the size of v.

$$vn1=v1/|v1|$$

$$vn2=v2/|v2|$$

When the camera is rotated, the rotation axis is orthogonal to the plane comprising the vectors v1 and v2, and is the line passing through the view point of the camera (point C). The direction vector of the rotation axis can be obtained by calculating the outer product of the vectors v1 and v2 (actually, the value obtained by normalizing the vectors v1 and v2) (step S703).

$$vx=vn1 \times vn2$$

vx indicates the vector of the direction of the rotation axis, and its elements are (l, m, n). Since the rotation angle θ is made by the vectors v1 and v2, it can be obtained as follows (actually, it is obtained by normalizing the vectors v1 and v2) (step S704).

$$\theta = \arccos(vn1 \cdot vn2)$$

Therefore, the correction matrix ΔMc for correction made by rotating a camera can be computed as follows (step S705).

$$\Delta M_C = \begin{bmatrix} ll(1-\cos\theta)+\cos\theta & ml(1-\cos\theta)-n\sin\theta & nl(1-\cos\theta)+m\sin\theta & 0 \\ lm(1-\cos\theta)+n\sin\theta & mm(1-\cos\theta)+\cos\theta & nm(1-\cos\theta)-l\sin\theta & 0 \\ ln(1-\cos\theta)-m\sin\theta & mn(1-\cos\theta)+l\sin\theta & nn(1-\cos\theta)+\cos\theta & 0 \\ 0 & 0 & 0 & 1 \end{bmatrix} \quad (1)$$

The position and orientation (external parameter) of the camera can be corrected by multiplying the matrix indicating the position and orientation of the camera (viewing transform matrix) by the correction matrix ΔMc. That is, the point P is displayed at the position of the point Q, and the predicted position of the landmark and the actual position matches on the image pickup screen.

<2. Correcting method by translating a camera>

Figure 8:
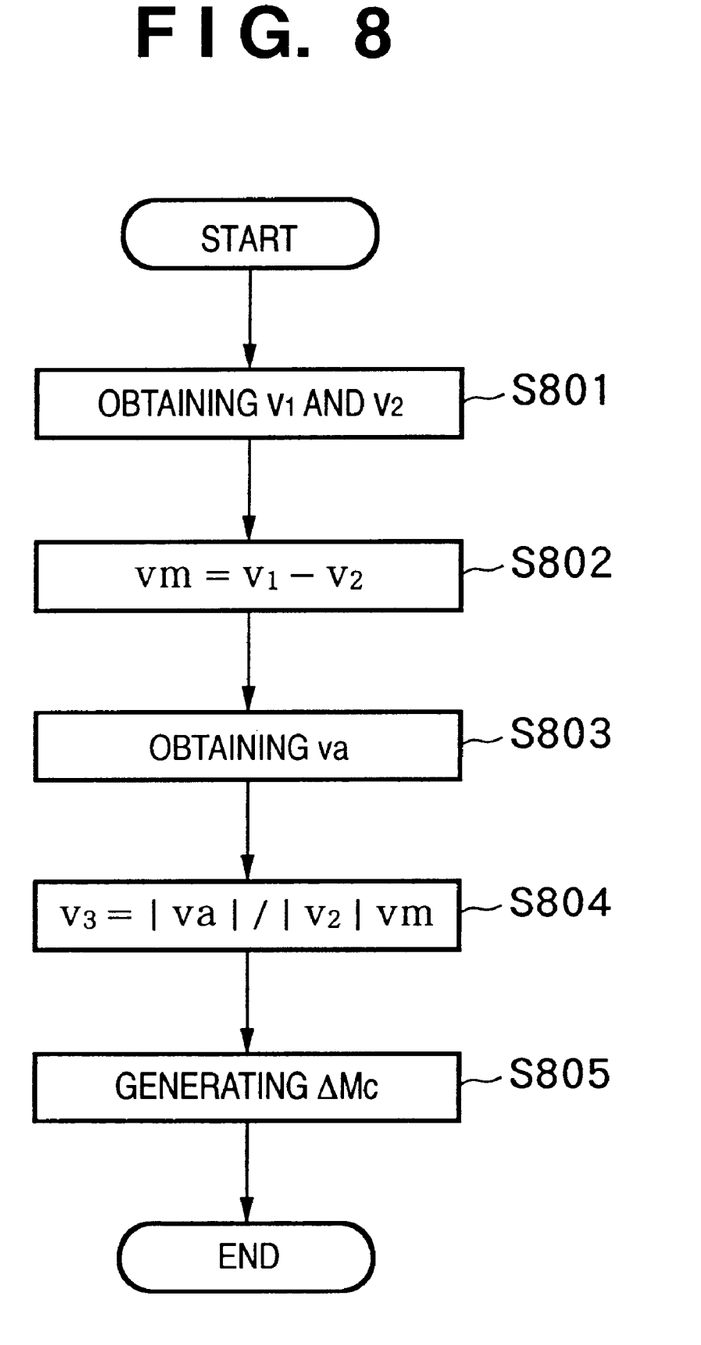
FIG. 8 is a flowchart of the correcting method by translation transform of a camera in the conventional correcting method.

When an error is corrected by translating a camera, as described above the position of the camera is translated in the direction from the point B to the point A by the distance between A and B. As a result, an object appearing at the position of the point P can be detected at the position of the point Q on the image pickup screen. First, the vectors v1 and v2 are obtained (step S801). A vector vm from the point P to the point Q is expressed as follows (step S802).

$$vm=v1-v2$$

Assuming that the vector from the point C to the point A is va (step S803), a vector v3 from the point A to the point B can be obtained as follows based on the similarity between the triangle CPQ and CAB (step S804).

$$v3=|va|/|v2| \times vm$$

Since the shift (|v3|) corresponds to the shift of the position of the landmark in the camera space, the correction matrix ΔMc used in moving the camera in parallel can be computed as follows (step S805).

$$\Delta M_C = \begin{bmatrix} 1 & 0 & 0 & -s \\ 0 & 1 & 0 & -t \\ 0 & 0 & 1 & -u \\ 0 & 0 & 0 & 1 \end{bmatrix} \quad (2)$$

The position and orientation (external parameter) of the camera can be corrected by multiplying the matrix indicating the position and orientation of the camera by the correction matrix ΔMc. As a result, an object appearing at the position of the point P can be detected at the point Q on the image pickup screen.

<Method according to the present embodiment>

In the above mentioned <conventional methods>, the error above described can be reduced only around a target landmark. However, a large error can be detected around other landmarks. Therefore, according to the present embodiment, a shift is detected for all landmarks within the view of the camera, thereby reducing an error for all landmarks by using the average error.

Figure 2:
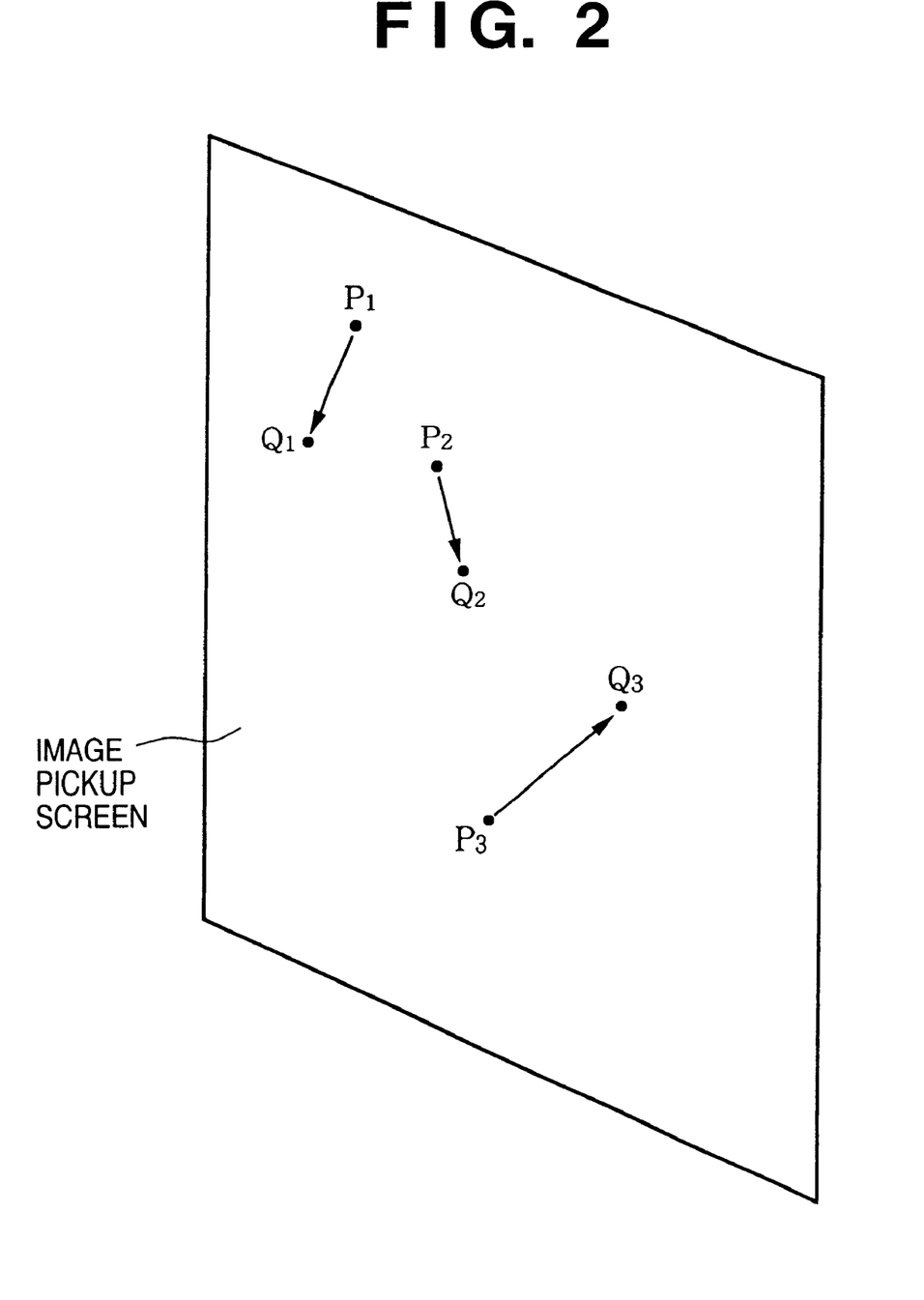
FIG. 2 shows a type of a correcting method according to a first embodiment of the present invention.

FIG. 2 shows a type of the correcting method according to the present embodiment. Points P1, P2, and P3 indicate the positions of the landmarks on the image pickup screen predicted based on the position and orientation of the camera. Points Q1, Q2, and Q3 indicate the actual positions of the landmarks projected on the image pickup screen. According to the present embodiment, a representative point (Pav) for the points P1, P2, and P3, and a representative point Qav for the points Q1, Q2, and Q3 are generated, and the camera is rotated or translated in parallel such that the representative point Pav matches the point Qav.

<Method 1>

Method 1 is described below by referring to the flowchart shown in FIG. 9. Assuming that Pi ($1 \leq i \leq n$) is a variable indicating the positions of the landmarks on the image pickup screen predicted based on the position and orientation of the camera, and Qi ($1 \leq i \leq n$) is a variable indicating the actual positions of the landmarks projected on the image pickup screen, the point at the position represented by an average value of all points Pi is used as the representative point Pav (step S901).

$Pav=(Xp\_av, Yp\_av)$ $Pi (Xpi, Ypi)$ $Xp\_av=(Xp1+Xp2+ \ldots +Xpn)/n$ $Yp\_av=(Yp1+Yp2+ \ldots +Ypn)/n$ Similarly, the point at the position indicated by the average value of all points Qi is used as the representative point Qav $Qav=(Xq\_av, Yq\_av)$ $Qi=(Xqi, Yqi)$ $Xq\_av=(Xq1+Xq2+ \ldots +Xqn)/n$ $Yq\_av=(Yq1+Yq2+ \ldots +Yqn)/n$ Using the obtained representative points Pav and Qav as the points P and Q shown in FIG. 1, the correcting method by rotating a camera as described above (refer to the flowchart shown in FIG. 7) or the correcting method by translating a camera (refer to the flowchart shown in FIG. 8) are performed (step S902) to generate the correction matrix ΔMc.

When a correction is made by translating a camera (when a process is performed according to the flowchart shown in FIG. 8), a representative point (average value) of the point (the point A shown in FIG. 1) indicating the positions of the landmarks on the image pickup screen predicted based on the position and orientation of the camera is obtained. This process is performed in step S901, and the point is used as the point A shown in FIG. 1.

<Method 2>

Assuming that Pi ($1 \leq i \leq n$) is a variable indicating the positions of the landmarks on the image pickup screen predicted based on the position and orientation of the camera, and Qi ($1 \leq i \leq n$) is a variable indicating the actual positions of the landmarks projected on the image pickup screen, the point at the position represented by an average weighting value of all points Pi is used as the representative point Pav.

$Pav (Xp\_av, Yp\_av)$ $Pi=(Xpi, Ypi)$ $Xp\_av=w1 \times Xp1+w2 \times Xp2+ \ldots +wn \times Xpn$ $Yp\_av=w1 \times Yp1+w2 \times Yp2+ \ldots +wn \times Ypn$ where $w1+w2+ \ldots +wn=1$ The weighting coefficient wi ($1 \leq i \leq n$) is a coefficient value which is larger for a point closer to the center of the image pickup screen according to the present embodiment. Otherwise, for example, a value is assigned only to a target area, and the weighting coefficient wi for the area other than the target area can be set to 0.

Similarly, the point at the position indicated by the average weighting value of all points Qi is used as the representative point Qav.

$Qav=(Xq\_av, Yq\_av)$ $Qi=(Xqi, Yqi)$ $Xq\_av=w1 \times Xq1+w2 \times Xq2+ \ldots +wn \times Xqn$ $Yq\_av=w1 \times Yq1+w2 \times Yq2+ \ldots +wn \times Yqn$ where $w1+w2+ \ldots +wn=1$ Using the obtained representative points Pav and Qav as the points P and Q shown in FIG. 1, corrections are made in the above mentioned methods by rotating a camera or translating it.

Figure 9:
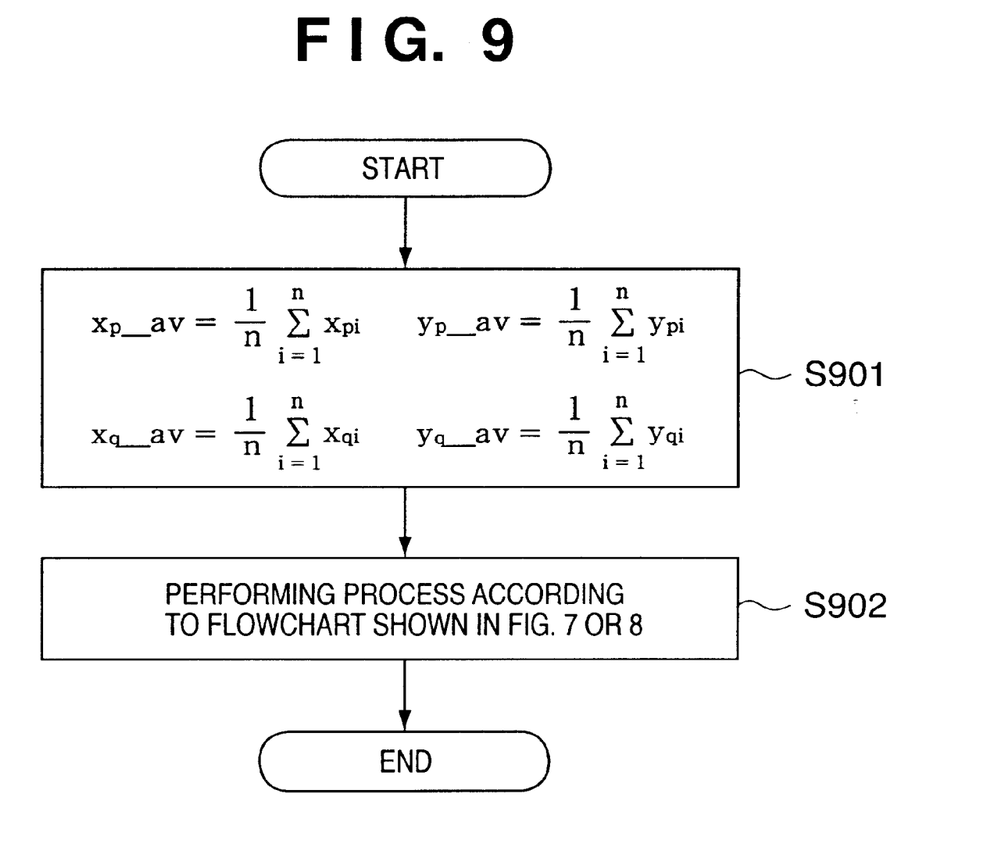
FIG. 9 is a flowchart of the process of <method 1>.

The flowchart of the process in <Method 2> is obtained by changing the process of computing an average value in step S901 in the flowchart shown in FIG. 9 into the above mentioned process of computing an average weighting value.

When a correction is made by translating a camera, a representative point (average weighting value) of points (the point A shown in FIG. 1) indicating the positions of the landmarks predicted based on the position and orientation of the camera is obtained. This process is performed in step S901, and the obtained point is used as the point A shown in FIG. 1.

<Method 3>

In the methods 1 and 2, one representative point Pav is obtained based on the positions of the landmarks on the image pickup screen predicted based on the position and orientation of the camera, and one representative point Qav is obtained based on the actual positions of the landmarks projected on the image pickup screen, thereby using the correcting method based on one landmark. These methods are less costly in the calculating and more efficient than the following method, but can cause the problem that the an average value is undesired when the methods are used for two landmarks which are quite different in depth.

In <Method 3>, a correction is made by rotating a camera, not obtain a representative point, but obtain the rotation angle of the camera for each landmark and the direction vector of the rotation axis using above mentioned correcting method by rotating a camera, and use an average of them. The <Method 3> is described below by referring to the flowchart of the process shown in FIG. 10.

Assume that Pi ($1 \leq i \leq n$) is a variable indicating the positions of the landmarks on the image pickup screen predicted based on the position and orientation of the camera, and Qi ($1 \leq i \leq n$) is a variable indicating the actual positions of the landmarks projected on the image pickup screen.

Figure 10:
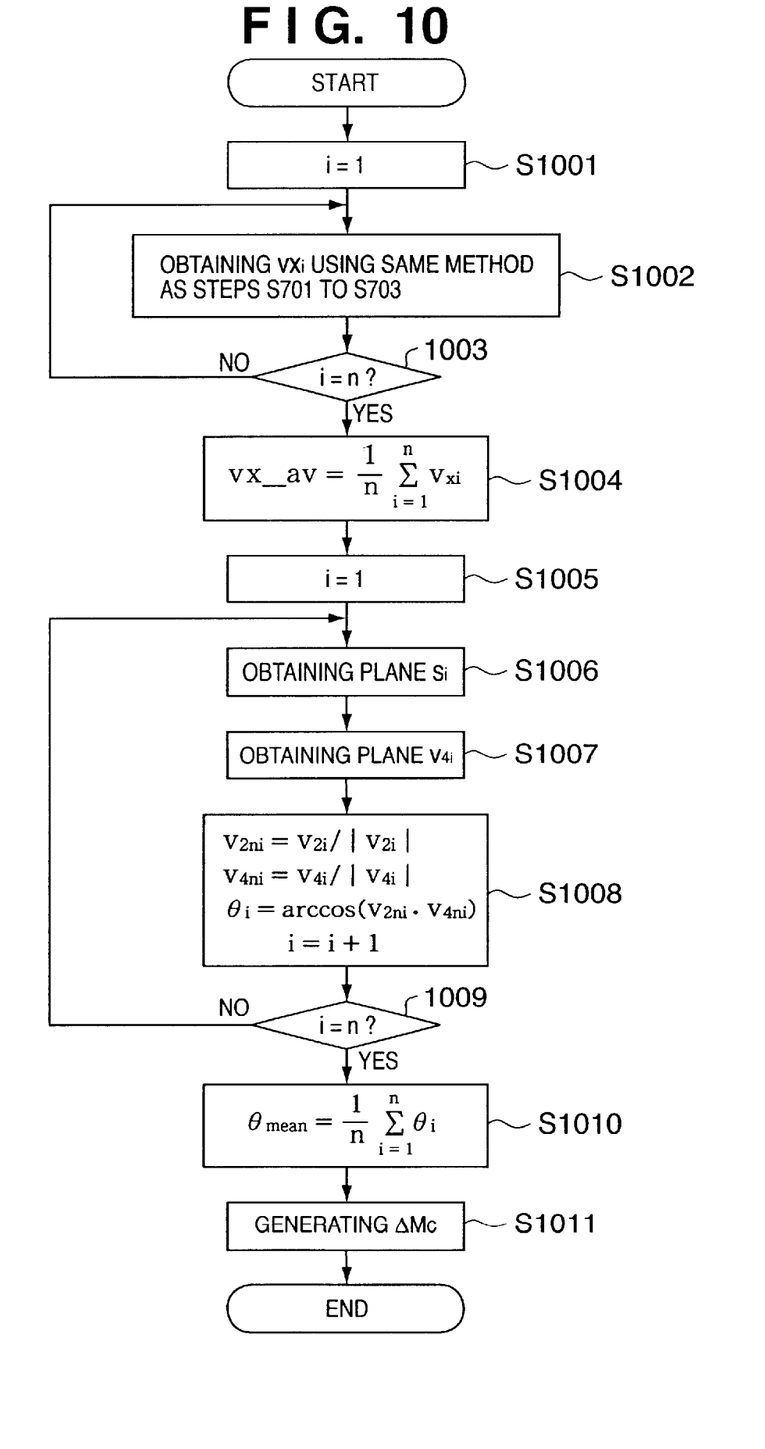
FIG. 10 is a flowchart of the process of <method 3>.

First, using each of the Pi and Qi, the direction vector vxi ($1 \leq i \leq n$) of the rotation axis is obtained (steps S1001 to S1003) in the method similar to the above mentioned correcting method by rotating a camera, and an average value vx_av of all vxi is obtained (step S1004).

$$vx\_av = (vx1 + vx2 + \ldots + vxn)/n$$

Figure 3:
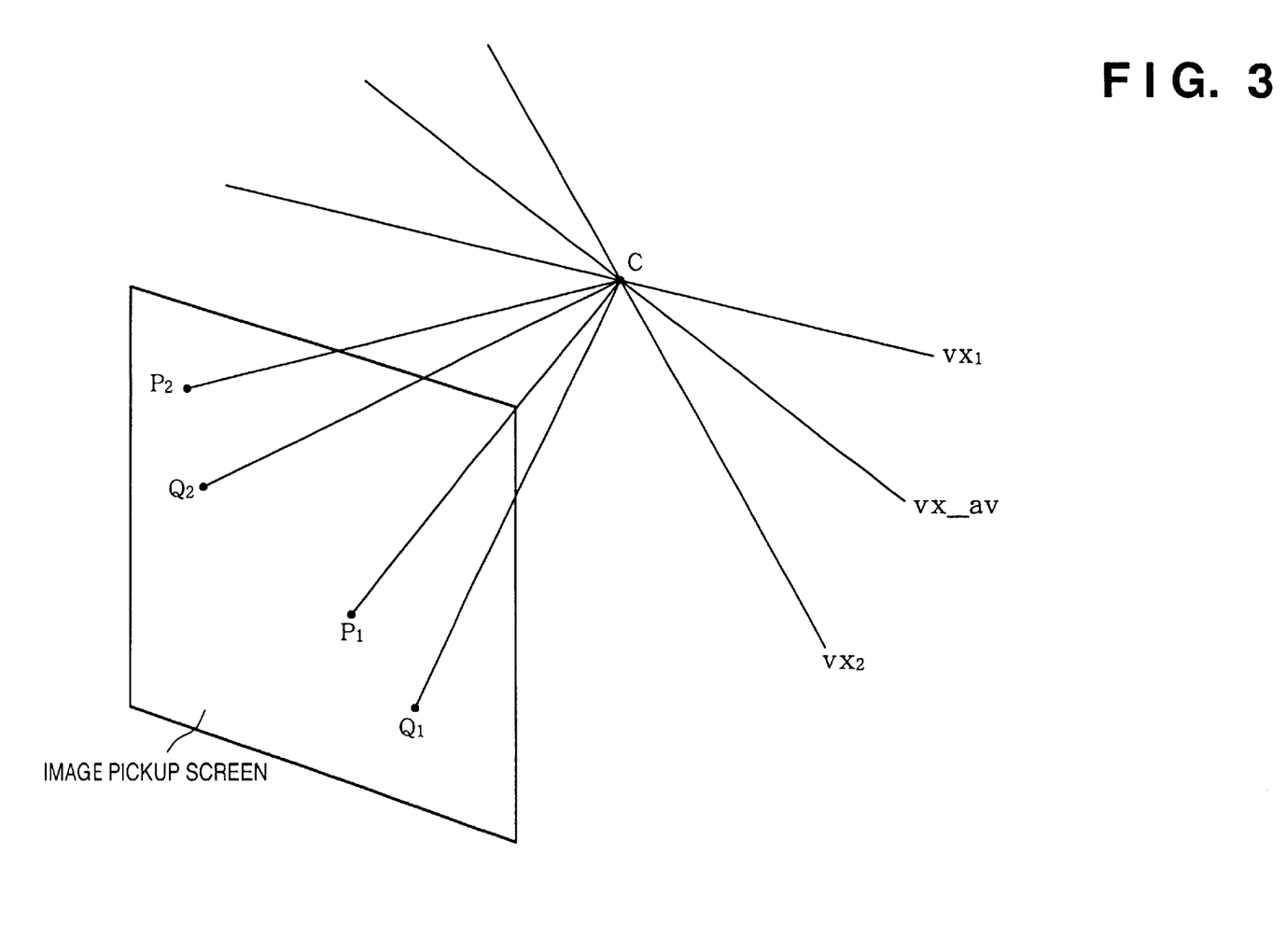
FIG. 3 shows a method of obtaining vx_av.

As shown in FIG. 3 in which the method of obtaining vx_av is shown, the vx_av is a direction vector of an average line of a rotation axis reflecting all Pi and Qi.

Figure 4:
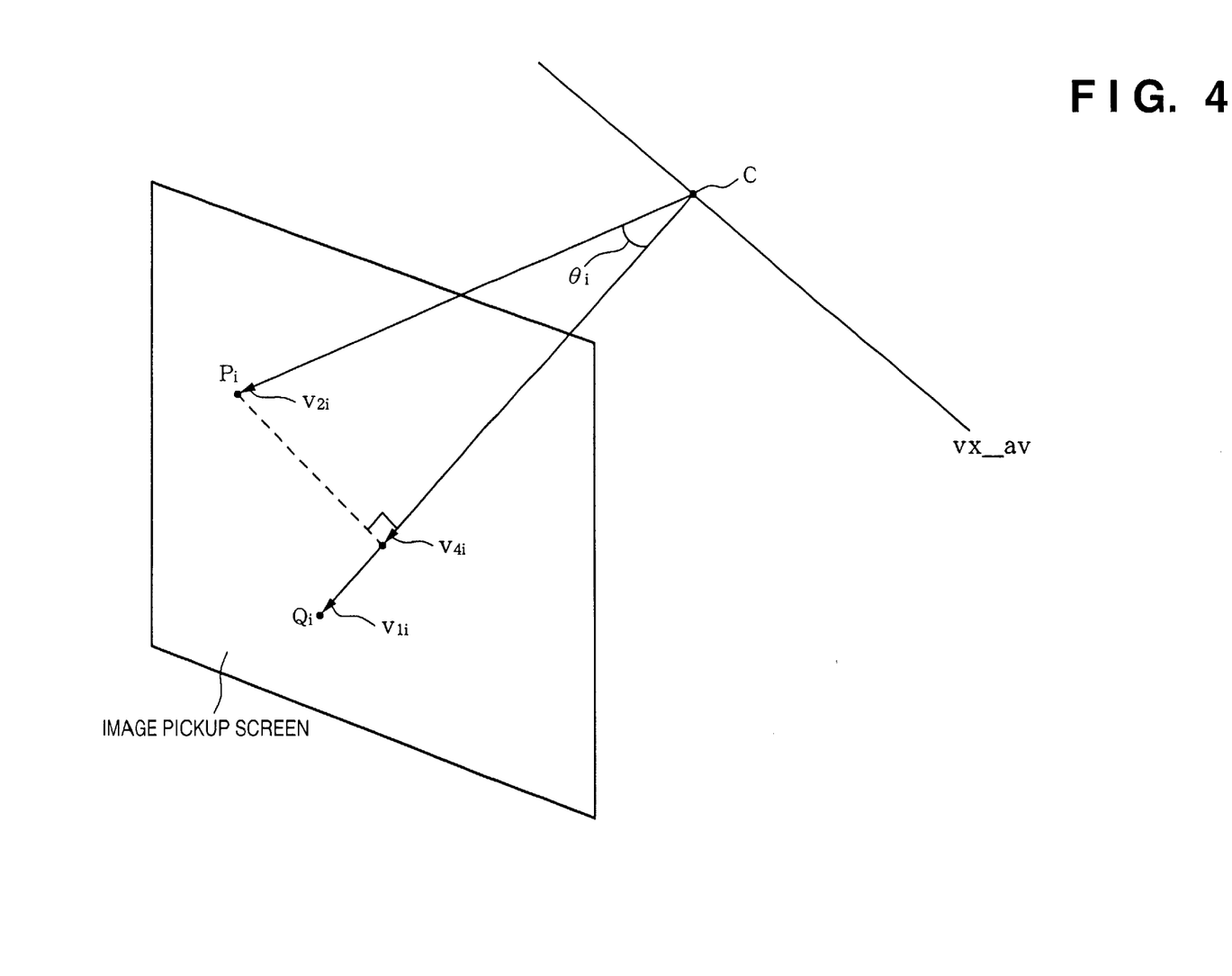
FIG. 4 shows a type of a vector v4$i$.

Then, a rotation angle for rotation on the rotation axis (line with vx_av defined as a direction vector) is obtained. First, a vector v1$i$ from the point C to the point Qi and a plane Si passing the vx_av are obtained (step S1006). Then, a vector v4$i$ is obtained by projecting a vector v2$i$ from the point C to the point Pi on the plane Si (step S1007). FIG. 4 shows a type of the method of generating the vector v4$i$ computed in each of the above mentioned processes. In FIG. 4, the rotation angle for matching the point Pi with the point Qi (by rotating the camera) is θi, and the rotation angle θi can be obtained by the following equations by using 2$i$ and v4$i$ (step S1008).

$$v2ni = v2i/|v2i|$$

$$v4ni = v4i/|v4i|$$

$$\theta i = \arccos(v2ni \cdot v4ni)$$

Then, the average value $\_{mean}$ of all rotation angles θi is computed (step S1010).

$$\_{mean} = (\theta1 + \theta2 + \ldots + \theta n)/n$$

As a result, by rotating the camera by the rotation angle $\_{mean}$ on the rotation axis using vx_av as a direction vector, the camera can be rotated with reflection of all Pi and Qi on the image pickup screen. As a result of the above mentioned computation, the correction matrix ΔMc can be obtained using vx_av and $\_{mean}$ (step S1011). Assuming that vx_av=(l', m', n'), the correction matrix ΔMc is expressed by the following equation.

$$\Delta M_C = \begin{bmatrix} l'l'(1-\cos\theta_{mean}) + \cos\theta_{mean} & m'l'(1-\cos\theta_{mean}) - n'\sin\theta_{mean} & n'l'(1-\cos\theta_{mean}) + m'\sin\theta_{mean} & 0 \\ l'm'(1-\cos\theta_{mean}) + n'\sin\theta_{mean} & m'm'(1-\cos\theta_{mean}) + \cos\theta_{mean} & n'm'(1-\cos\theta_{mean}) - l'\sin\theta_{mean} & 0 \\ l'n'(1-\cos\theta_{mean}) - m'\sin\theta_{mean} & m'n'(1-\cos\theta_{mean}) + l'\sin\theta_{mean} & n'n'(1-\cos\theta_{mean}) + \cos\theta_{mean} & 0 \\ 0 & 0 & 0 & 1 \end{bmatrix} \quad (3)$$

The position and orientation (external parameter) of the camera can be corrected by multiplying the matrix indicating the position and orientation of the camera by the correction matrix ΔMc. That is, each point Pi on the image pickup screen is displayed near each point Qi on an average, and the predicted position of the landmark matches on an average with the actual position of the landmark. In this method, a correction matrix can be generated with the position information about all landmarks on the image pickup screen reflected, and the orthogonality of the coordinate system transformed by the generated correction matrix can be maintained.

<Method 4>

In the method 3, when vx_av and $\_{mean}$ are obtained, an average value is obtained for each of vxi and θi. However, in <Method 4>, it is obtained by computing an average weighting value. That is, it is computed by the following equation.

$$vx\_ = w1 \times vx1 + w2 \times vx2 + \ldots + wn \times vxn$$

$$\_{mean} = w1 \times \theta1 + w2 \times \theta2 + \ldots + wn \times \theta n$$

where $w1 + w2 + \ldots + wn = 1$

Other steps are similar to those in the method 3. The flowchart of the process in the <Method 4> is obtained by changing the average computation in steps S1004 and S1010 in the flowchart shown in FIG. 10 into the above mentioned average weighting computation.

<Method 5>

Figure 11:
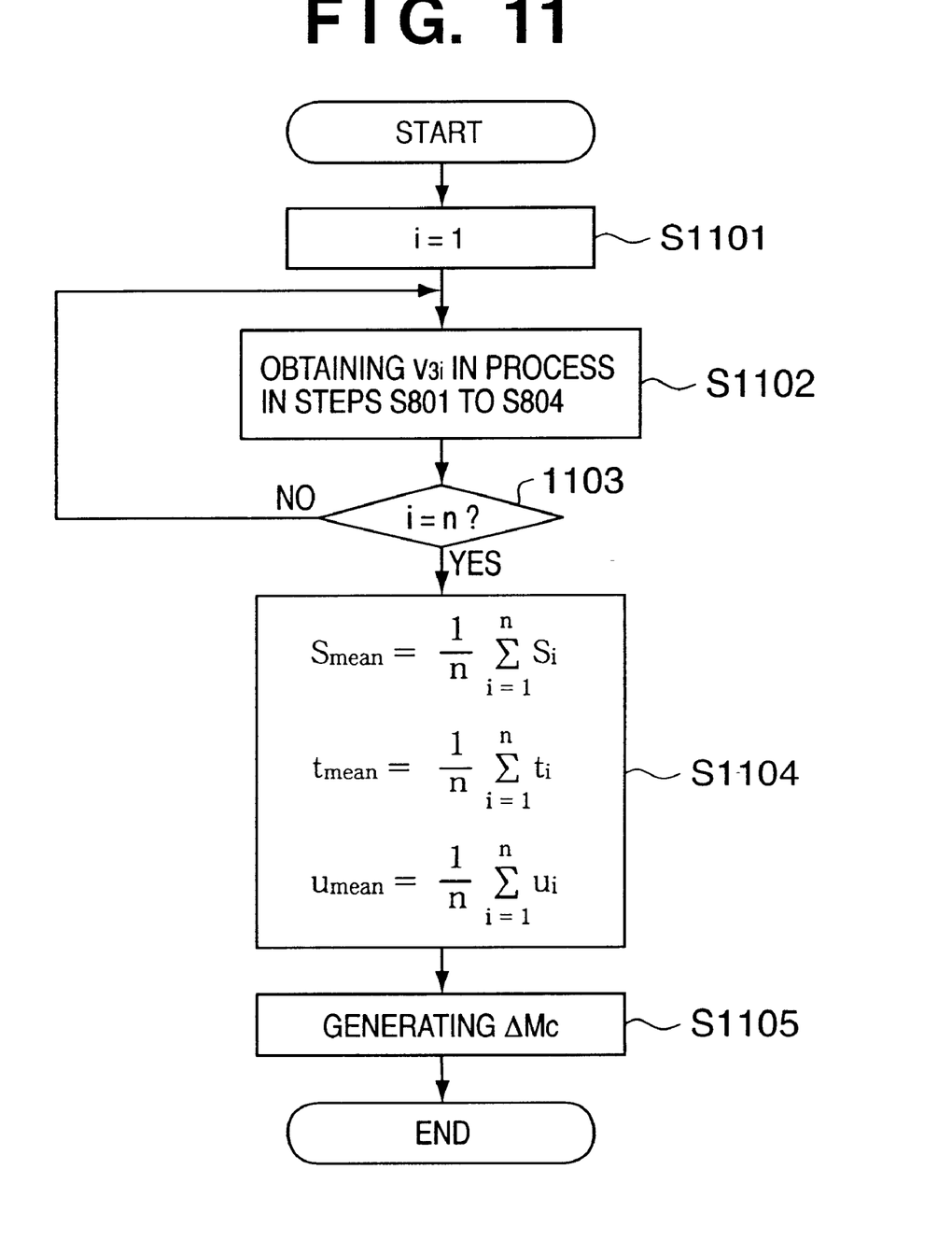
FIG. 11 is a flowchart of the process of <method 5>.

In the methods 1 and 2, one representative point Pav is obtained based on the positions of the landmarks on the image pickup screen predicted based on the position and orientation of the camera, and one representative point Qav is obtained based on the actual positions of the landmarks projected on the image pickup screen, thereby using the correcting method based on one landmark. In <Method 5>, a correcting method by moving a camera in parallel is suggested, not obtain a representative point, but obtain a translation transform element of a camera for each landmark in the above mentioned correcting method by translating the camera, and the obtained element is used on an average. FIG. 11 is a flowchart of the process of <Method 5>.

Assume that Pi ($1 \leq i \leq n$) is a variable indicating the positions of the landmarks on the image pickup screen predicted based on the position and orientation of the camera, and Qi ($1 \leq i \leq n$) is a variable indicating the actual positions of the landmarks projected on the image pickup screen. First, using the above mentioned correcting method by translating a camera, the vector v3$i$=(si, ti, ui) is obtained for each of Pi and Qi (step S1101 to S1103). Then, an average value of the vector v3$i$ is obtained for each of Pi and Qi (step S1104).

$$s_{mean}=(s1+s2+ \ldots +sn)/n$$

$$t_{mean}=(t1+t2+ \ldots +tn)/n$$

$$u_{mean}=(u1+u2+ \ldots +un)/n$$

Using $s_{mean}$, $t_{mean}$, and $u_{mean}$, a correction matrix is obtained as follows (step S1105).

$$\Delta M_C = \begin{bmatrix} 1 & 0 & 0 & -s_{mean} \\ 0 & 1 & 0 & -t_{mean} \\ 0 & 0 & 1 & -u_{mean} \\ 0 & 0 & 0 & 1 \end{bmatrix} \quad (4)$$

<Method 6>

In the method 5, when the translation transform element of a camera is obtained, an average value of the vector v3$i$ is used. However, in method 6, an average weighting value is used. The average weighting value is obtained by the following equations $$s_{w\_mean}=w1 \times s1+w2 \times s2+ \ldots +wn \times sn$$

$$t_{w\_mean}=w1 \times t1+w2 \times t2+ \ldots +wn \times tn$$

$$u_{w\_mean}=w1 \times u1+w2 \times u2+ \ldots +wn \times un$$

where $w1+w2+ \ldots +wn=1$.

A correction matrix is obtained as follows using $s_{w\_mean}$, $t_{w\_mean}$, and $u_{w\_mean}$.

$$\Delta M_C = \begin{bmatrix} 1 & 0 & 0 & -s_{w\_mean} \\ 0 & 1 & 0 & -t_{w\_mean} \\ 0 & 0 & 1 & -u_{w\_mean} \\ 0 & 0 & 0 & 1 \end{bmatrix} \quad (5)$$

The flowchart of the process in the <Method 6> is obtained by changing the average computation in steps S1104 in the flowchart shown in FIG. 11 into the above mentioned average weighting computation.

<Method 7>

In any of the methods 1 to 6, a correction matrix is computed by either rotating a camera or translating it, and a correction matrix having elements of both rotation and translation cannot be obtained. Then, in method 7, the computation of a correction matrix by rotation and the computation of a correction matrix by translation are performed to compute a correction matrix by combining the above mentioned matrices.

First, a correction matrix by rotation is obtained in any method above mentioned. Then, using the obtained correction matrix, the position and orientation of the camera is corrected, and the position of the landmark on the image pickup screen is obtained. Based on the obtained predicted position, a new correction matrix by translation is obtained in any method. In this method, a correction can be first made by translation, and then a correction can be made by rotation.

In addition, without making corrections once by rotation and once by translation as described above, the processes can be alternately repeated.

Furthermore, when they are repeatedly performed, the numbers of times they are performed can be determined not only predetermined times, but also based on the error between the position of a landmark on the image pickup screen predicted from the position and orientation of the camera and the position obtained by actually capturing the position. The method can be used by determining whether or not the error indicates a value equal to or smaller than a predetermined threshold, by determining whether or not the amount of a change in the error is equal to or smaller than a predetermined value, or by combining the determination above.

<Correcting Apparatus>

Figure 5:
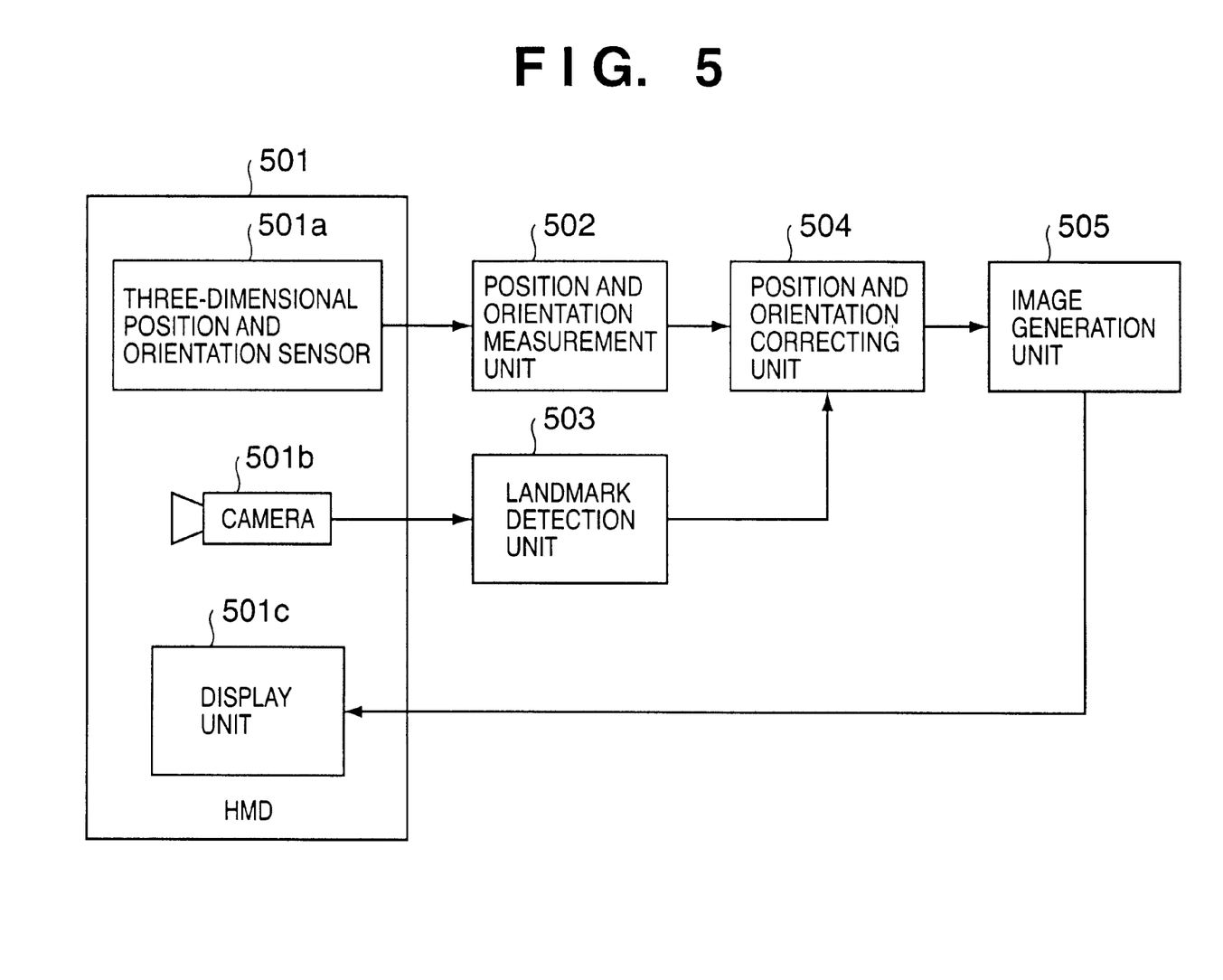
FIG. 5 shows a configuration of an outline of the correcting apparatus according to the first embodiment of the present invention.

FIG. 5 shows the rough configuration of the correcting apparatus for performing the above mentioned correcting processes according to the embodiment of the present invention. Reference numeral 501 denotes a head mounted display (hereinafter referred to as an HMD). The HMD 501 comprises a three-dimensional position and orientation sensor 501a for outputting a signal based on the position and orientation of the HMD 501 in the three-dimensional space to a position and orientation measurement unit 502 described later, a camera 501b for capturing an image of an object in the real space, and a display unit 501c for providing a picture for a user who has the HMD 501 on his or her head. The HMD 501 according to the present embodiment is of a video see-through type. The position and orientation of the HMD 501 refers to the position and orientation of the camera 501b.

The position and orientation measurement unit 502 generates a matrix (viewing transform matrix) indicating the position and orientation of the HMD 501 based on the signal output from the three-dimensional position and orientation sensor 501a. Reference numeral 503 denotes a landmark detection unit. The landmark detection unit 503 detects a landmark from a picture captured by the camera 501b. It also detects the position of the landmark. The method of detecting them is not specified here. However, for example, a marker of a specified color is used as a landmark. Then, the specified color is detected in the picture captured by the camera 501b. As a result, the landmark and its position can be detected in the picture.

Reference numeral 504 denotes a position and orientation correction unit. The position and orientation correction unit 504 computes a correction matrix using any of the above mentioned methods (any method in <Method 1> to <Method 7>) according to the position information about each landmark output from the landmark detection unit 503. Then, the matrix indicating the position and orientation of the HMD 501 output from the position and orientation measurement unit 502 is multiplied by the computed matrix. As a result, the position and orientation (external parameter) of the HMD 501 can be corrected. Reference numeral 505 denotes an image generation unit. The image generation unit 505 generates a picture of a virtual object based on the matrix corrected by the position and orientation correction unit 504, and augmenteds the picture and the picture in the real space input from the camera 501b. As a result, a picture (image) of augmented reality can be generated. It is assumed that the data relating to the virtual object is stored in the external memory. The generated image is output to the display unit 501c.

Figure 6:
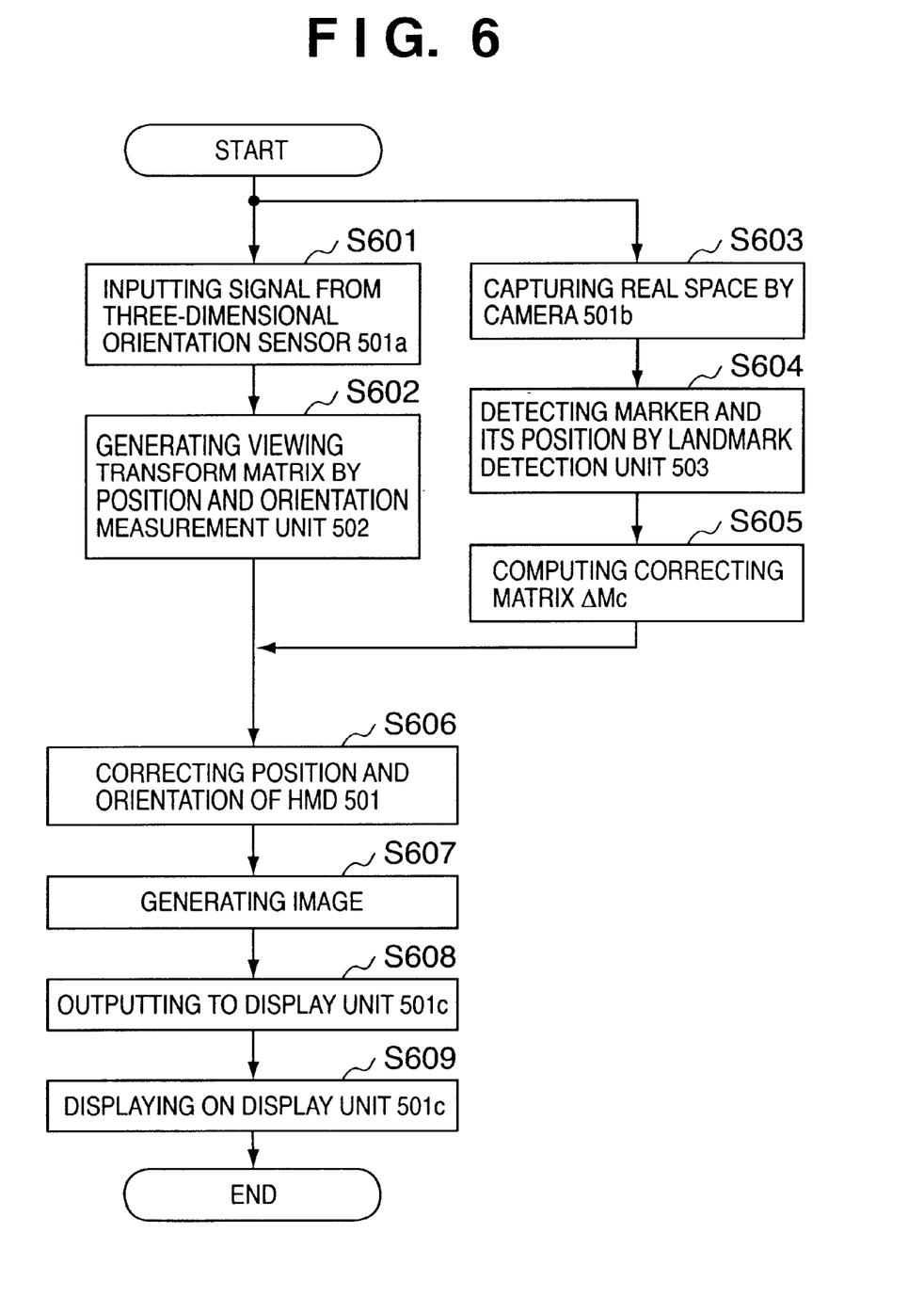
FIG. 6 is a flowchart of a main process performed by the correcting apparatus according to the first embodiment of the present invention.

FIG. 6 is a flowchart of the processes mainly performed by the correcting apparatus with the above mentioned configuration. Since each of the processes is described above, the detailed explanation is omitted here. The program code according to the flowchart shown in FIG. 6 is stored in the memory such as RAM, ROM, etc. stored in the correcting apparatus according to the present embodiment, not shown in the attached drawings, but read and executed by the CPU also not shown in the attached drawings.

First, a signal indicating the position and orientation of the HMD 501 is input from the three-dimensional position and orientation sensor 501a to the position and orientation measurement unit 502 (step S601), and the position and orientation measurement unit 502 generates a viewing transform matrix indicating the position and orientation of the HMD 501 according to the input signal (step S602). On the other hand, a picture in the real space is captured by the camera 501b (step S603). The captured picture is input to the landmark detection unit 503, and the landmark and its position are detected (step S604). The position and orientation correction unit 504 generates a correction matrix ΔMc according to the above-mentioned methods (any of <Method 1> to <Method 7>) based on the detected position of the landmark (step S605).

Using the viewing transform matrix indicating the position and orientation of the HMD 501 and the correction matrix ΔMc generated in the processes above, the position and orientation correction unit 504 corrects the position and orientation of the HMD 501 (step S606). According to the external parameter indicating the corrected position and orientation of the HMD 501, the image generation unit 505 generates a picture of a virtual object, and generates a picture of augmented reality (step S607). Then, the generated picture of augmented reality is output to a display unit 101a, (step S608), and displayed on the display unit 101a (step S609).

As described above, the correcting apparatus and method according to the present embodiment can correct the position and orientation of the HMD 501 although the measurement precision of the position and orientation of the HMD 501 obtained by the three-dimensional position and orientation sensor 501a is not satisfactory.

In addition, a position error can be prevented although a picture in the real space captured by the camera 502b in the HMD 501 is augmenteded with a picture of a virtual object generated based on the position and orientation of the HMD 501.

In addition, since the position and orientation of the HMD 501 are corrected using all landmarks on the image pickup screen, a large change in a correction value is not made by changing the view of the camera.

Note that the present invention may be applied to either a system constituted by a plurality of devices (e.g., a host computer, an interface device, a reader, a printer, and the like), or an apparatus consisting of a single equipment (e.g., a copying the machine, a facsimile apparatus, or the like).

The objects of the present invention are also by supplying a storage medium, which records a program code of a software program that can implement the functions of the above mentioned embodiments to the system or apparatus, and reading output and executing the program code stored in the storage medium by a computer (or a CPU or MPU) of the system or apparatus.

In this case, the program code itself read out from the storage medium implements the functions of the above mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above mentioned embodiments may be implemented not only by executing the readout program code by the computer but also by some or all of actual processing operations executed by an OS (operating system) running on the computer on the basis of an instruction of the program code.

The present invention includes a product, e.g., a printout, obtained by the image processing method of the present invention.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

When the present invention is applied to the above mentioned storage medium, the storage medium stores a program code corresponding to at least one flowchart in the flowcharts shown in FIG. 6 as described above and described in <Method 1> to <Method 6>.

As many apparently widely different embodiments of the present invention can be made without departing from the spirit and scope thereof, it is to be understood that the invention is not limited to the specific embodiments thereof except as defined in the appended claims.

What is claimed is:

1. A position and orientation determination apparatus which identifies a parameter indicating a position and orientation of a capture unit adapted to capture a picture in a real space containing a plurality of feature points whose positions are known in a three-dimensional array, comprising:

a position and orientation measurement unit adapted to measure the position and orientation of the capture unit in a method other than using a captured picture;

a detection unit adapted to detect the plurality of feature points and their positions in a two-dimensional array on an image pickup screen using the picture in the real space captured by the capture unit;

a prediction unit adapted to predict the positions of the feature points in the two-dimensional array on the image pickup screen based on the position and orientation of the capture unit measured by said position and orientation measurement unit;

a correction unit adapted to correct a parameter of the measured position and orientation of the capture unit based on an average value or an average weighting value of the positions of the feature points on the image pickup screen of the capture unit obtained by said prediction unit, and based on an average value or an average weighting value of the positions of the feature points obtained by said detection unit; and an image generation unit adapted to generate an image of a virtual object based on the corrected parameter, and to superimpose the image of the virtual object on the picture in the real space captured by the capture unit.

2. The position and orientation determination apparatus according to claim 1, wherein an artificially applied marker is used as the plurality of feature points whose three-dimensional positions are known.

3. The position and orientation determination apparatus according to claim 1, wherein a point originally existing in the real space as the plurality of feature points whose three-dimensional positions are known, and whose two-dimensional positions can be detected on the image pickup screen by said detection unit.

4. The position and orientation determination apparatus according to claim 1, wherein said position and orientation measurement unit is a sensor for measuring the position and orientation of the capture unit.

5. The position and orientation determination apparatus according to claim 1, wherein said correction unit corrects the parameter such that the capture unit either rotates or translates.

6. The position and orientation determination apparatus according to claim 1, wherein said correction unit corrects the parameter of the capture unit by combining rotation transform with translation transform.

7. The position and orientation determination apparatus according to claim 1, wherein when the parameter of the capture unit is processed plural times alternately by rotation transform and translation transform, said correction unit repeats the process until an average value or an average weighting value of an error between the position of the feature point corrected by said prediction unit and the position of the feature point on the image pickup screen is equal to or less than a predetermined value or until the error cannot be smaller.

8. The position and orientation determination apparatus according to claim 1, wherein when said correction unit corrects the parameter such that the capture unit can rotate, the feature point whose position predicted by said prediction unit is associated with the feature point detected by said detection unit, a rotation axis and a rotation angle with which the position of the feature point on the image pickup screen of the capture unit using the position of the feature point obtained by said prediction unit matches the position of the feature point on the image pickup screen of the capture unit obtained by said detection unit are obtained for each feature point, and the parameter can be corrected by using average values of the rotation axis and the rotation angle obtained for each feature point which is dealt with.

9. The position and orientation determination apparatus according to claim 1, wherein when said correction unit corrects the parameter such that the capture unit can rotate, the feature point whose position predicted by said prediction unit is associated with the feature point detected by said detection unit, a rotation axis and a rotation angle with which the position of the feature point on the image pickup screen of the capture unit using the position of the feature point obtained by said prediction unit matches the position of the feature point on the image pickup screen of the capture unit obtained by said detection unit are obtained for each feature point which is dealt with, and the parameter can be corrected using average weighting values of the rotation axis and the rotation angle obtained for each feature point which is dealt with.

10. The position and orientation determination apparatus according to claim 1, wherein when said correction unit corrects the parameter such that the capture unit can translate, the feature point whose position predicted by said prediction unit is associated with the feature point detected by said detection unit, a difference between the position of the feature point obtained by said prediction unit and the position of the feature point obtained by said detection unit is obtained for each feature point which is dealt with, and the parameter can be corrected using average values of the difference obtained for each feature point which is dealt with.

11. The position and orientation determination apparatus according to claim 1, wherein when said correction unit corrects the parameter such that the capture unit can translate, the feature point whose position predicted by said prediction unit is associated with the feature point detected by said detection unit, a difference between the position of the feature point obtained by said prediction unit and the position of the feature point obtained by said detection unit is obtained for each feature point which is dealt with, and the parameter can be corrected using average weighting values of the difference obtained for each feature point which is dealt with.

12. The position and orientation determination apparatus according to claim 4, wherein said sensor is a magnetic sensor for measuring the three-dimensional position and orientation of the capture unit.

13. The position and orientation determination apparatus according to claim 6, wherein said correction unit corrects the parameter of the capture unit by combining rotation transform with translation transform alternately and plural times.

14. The position and orientation determination apparatus according to claim 6, wherein said correction unit corrects the parameter such that the capture unit can rotate, and then re-predicts the two-dimensional position of the feature point on the image pickup screen based on the position of the feature point in the real space and the position and orientation of the camera after the correction, and the capture unit can translate.

15. The position and orientation determination apparatus according to claim 6, wherein said correction unit corrects the parameter such that the capture unit can translate, and then re-predicts the two-dimensional position of the feature point on the image pickup screen based on the position of the feature point in the real space and the position and orientation of the camera after the correction, and the capture unit can rotate.

16. A position and orientation determination method which identifies a parameter indicating a position and orientation of a capture unit adapted to capture a picture in a real space containing a plurality of feature points whose positions are known in a three-dimensional array, said method comprising:

a position and orientation measurement step of measuring the position and orientation of the capture unit with a method other than using a captured picture;

a detection step of detecting the plurality of feature points and their positions in a two-dimensional array on an image pickup screen using the picture in the real space captured by the capture unit;

a prediction step of predicting the positions of the feature points in the two-dimensional array on the image pickup screen based on the position and orientation of the capture unit measured in said position and orientation measurement step;

a correction step of correcting a parameter of the measured position and orientation of the capture unit based on an average value or an average weighting value of the positions of the feature points on the image pickup screen of the capture unit obtained in said prediction step, and based on an average value or an average weighting value of the positions of the feature points obtained in said detection step; and an image generation step of generation an image of a virtual object based on the corrected parameter, and superimposing the image of the virtual object on the picture in the real space captured by the capture unit.

* * * * *

UNITED STATES PATENT AND TRADEMARK OFFICE
CERTIFICATE OF CORRECTION

PATENT NO. : 6,834,250 B2  
DATED : December 21, 2004  
INVENTOR(S) : Shinji Uchiyama et al.

Page 1 of 1

It is certified that error appears in the above-identified patent and that said Letters Patent is hereby corrected as shown below:

Title page,
Item [57] ABSTRACT,
Line 1, "and a" should read -- and an --.

Column 1,
Line 20, "augmenteding" should read -- augmenting --.

Column 2,
Line 53, "constitutes" should read -- constitute --.

Column 10,
Line 51, "augmenteds" should read -- augments --.

Column 11,
Line 29, "501ais" should read -- 501a is --.
Line 32, "augmenteded" should read -- augmented --.

Column 12,
Line 5, "CPU" should read -- a CPU --.

Column 14,
Line 58, "of generation" should read -- of generating --.

Signed and Sealed this

Twenty-eighth Day of June, 2005

JON W. DUDAS
*Director of the United States Patent and Trademark Office*